(12) United States Patent
Jones

(10) Patent No.: US 9,674,409 B2
(45) Date of Patent: Jun. 6, 2017

(54) IMAGE CAPTURING SYSTEM AND METHOD OF USE

(71) Applicant: Michael J. Jones, Hudson Falls, NY (US)

(72) Inventor: Michael J. Jones, Hudson Falls, NY (US)

(*) Notice: Subject to any disclaimer, the term of this patent is extended or adjusted under 35 U.S.C. 154(b) by 339 days.

(21) Appl. No.: 14/032,131

(22) Filed: Sep. 19, 2013

(65) Prior Publication Data

US 2015/0145990 A1    May 28, 2015

Related U.S. Application Data

(60) Provisional application No. 61/744,155, filed on Sep. 19, 2012, provisional application No. 61/796,407, filed on Nov. 12, 2012.

(51) Int. Cl.
*G03B 17/02* (2006.01)
*H04N 5/00* (2011.01)
*H04N 5/225* (2006.01)

(52) U.S. Cl.
CPC ........... *H04N 5/2252* (2013.01); *G03B 17/02* (2013.01)

(58) Field of Classification Search
None
See application file for complete search history.

(56) References Cited

U.S. PATENT DOCUMENTS

| | | | |
|---|---|---|---|
| 4,270,679 A | 6/1981 | Gildea et al. | |
| 5,200,827 A | 4/1993 | Hanson et al. | |
| 5,810,313 A | 9/1998 | Armstrong | |
| 6,028,627 A * | 2/2000 | Helmsderfer | A42B 3/042 345/8 |
| 6,292,213 B1 | 9/2001 | Jones | |
| 6,704,044 B1 | 3/2004 | Foster et al. | |
| 7,551,225 B2 | 6/2009 | Overstreet | |
| 7,576,800 B2 | 8/2009 | Swain | |
| 7,581,833 B2 | 9/2009 | Howell et al. | |
| 7,739,076 B1 | 6/2010 | Vock et al. | |

(Continued)

FOREIGN PATENT DOCUMENTS

WO    WO 2012/027799    *    3/2012    ............ H04N 5/225

OTHER PUBLICATIONS

Office Action dated Jan. 21, 2016 for Applicant's Co-pending U.S. Appl. No. 14/885,993, filed Oct. 16, 2015.

*Primary Examiner* — Reza Aghevli
(74) *Attorney, Agent, or Firm* — Tech Valley Patent, LLC; John Pietrangelo

(57) ABSTRACT

Image capturing systems and methods of capturing images, especially in contact prone environments are provided. The image capturing systems includes an optical sensor and output device adapted to receive the electrical signals from optical sensor and transmit a corresponding signal, and a housing retaining the optical sensor and the output device. The housing is adapted to mount to a surface, for example, inside or on top of a helmet, and includes a low profile above the surface and a footprint in contact with the surface. The size of the footprint is selected whereby and impact loads on the housing are minimized or attenuated before being transmitted to the surface to which the housing is mounted. The invention is uniquely applicable to head gear mounting, but may be used on a broad range of article and a broad range of fields.

16 Claims, 6 Drawing Sheets

(56) References Cited

U.S. PATENT DOCUMENTS

| | | | |
|---|---|---|---|
| 8,120,651 B2 | 2/2012 | Ennis | |
| 8,239,146 B2 | 8/2012 | Vock et al. | |
| 8,514,285 B2 | 8/2013 | Yoshizumi | |
| 9,016,961 B2 | 4/2015 | Hulse | |
| 9,071,675 B2 | 6/2015 | Willenborg | |
| 9,229,299 B1 | 1/2016 | Morlon | |
| 2004/0261159 A1 | 12/2004 | Reilly | |
| 2008/0170130 A1* | 7/2008 | Ollila | H04N 5/2252 348/211.99 |
| 2009/0322937 A1* | 12/2009 | Young | H04B 7/0814 348/373 |
| 2010/0005636 A1 | 1/2010 | Liao | |
| 2010/0020229 A1* | 1/2010 | Hershey | H04N 5/2251 348/376 |
| 2010/0060747 A1* | 3/2010 | Woodman | G03B 17/02 348/222.1 |
| 2010/0253826 A1* | 10/2010 | Green | H04N 5/2252 348/335 |
| 2010/0277591 A1* | 11/2010 | Kowalsky | H04N 7/185 348/158 |
| 2012/0120258 A1* | 5/2012 | Boutell | G03B 11/048 348/207.1 |
| 2012/0206565 A1* | 8/2012 | Villmer | H04N 1/00 348/36 |
| 2013/0033610 A1 | 2/2013 | Osborn | |
| 2014/0139679 A1 | 5/2014 | Orbassano | |

\* cited by examiner

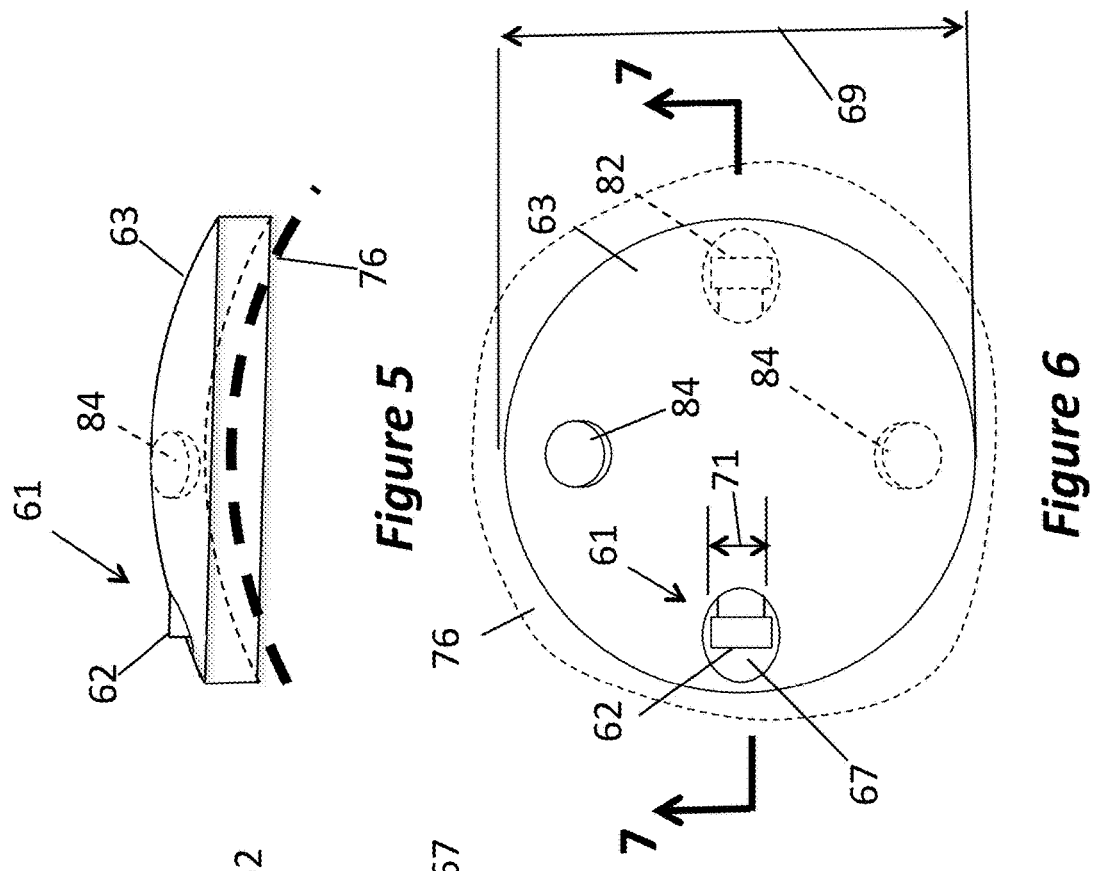
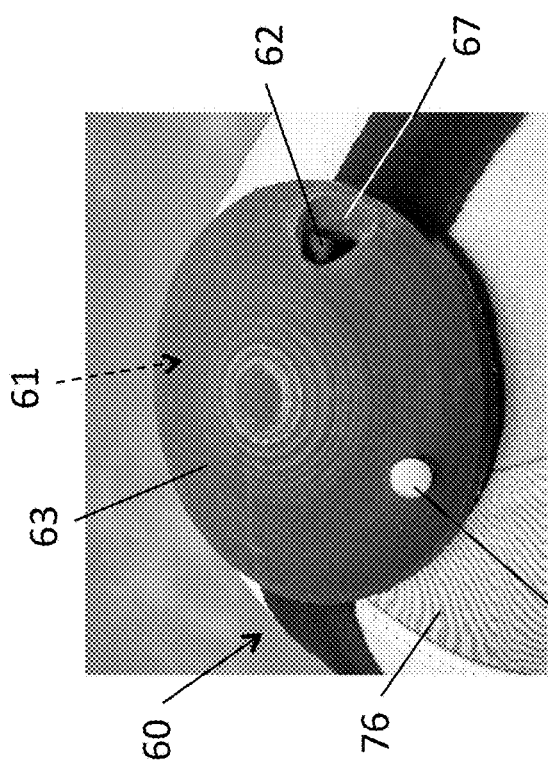
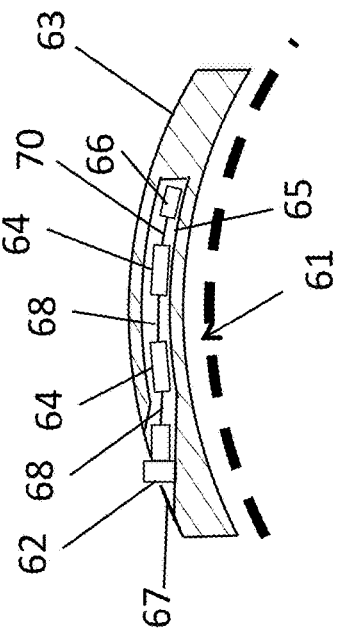

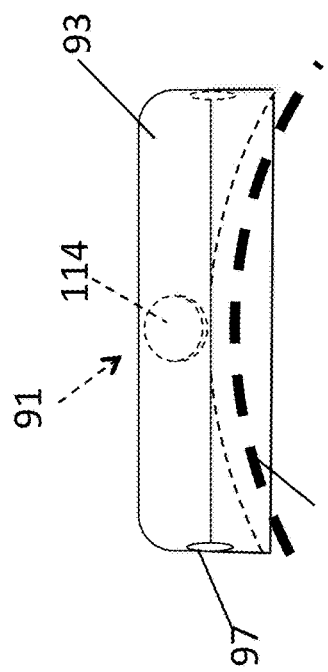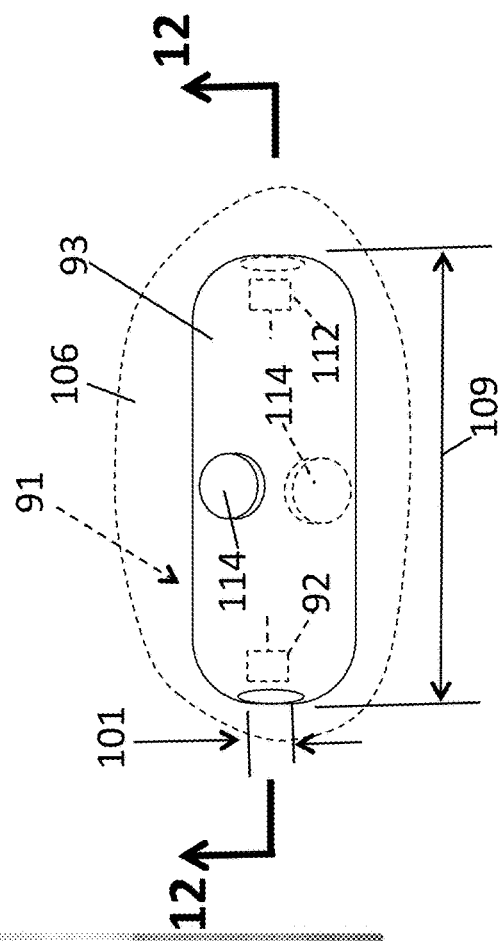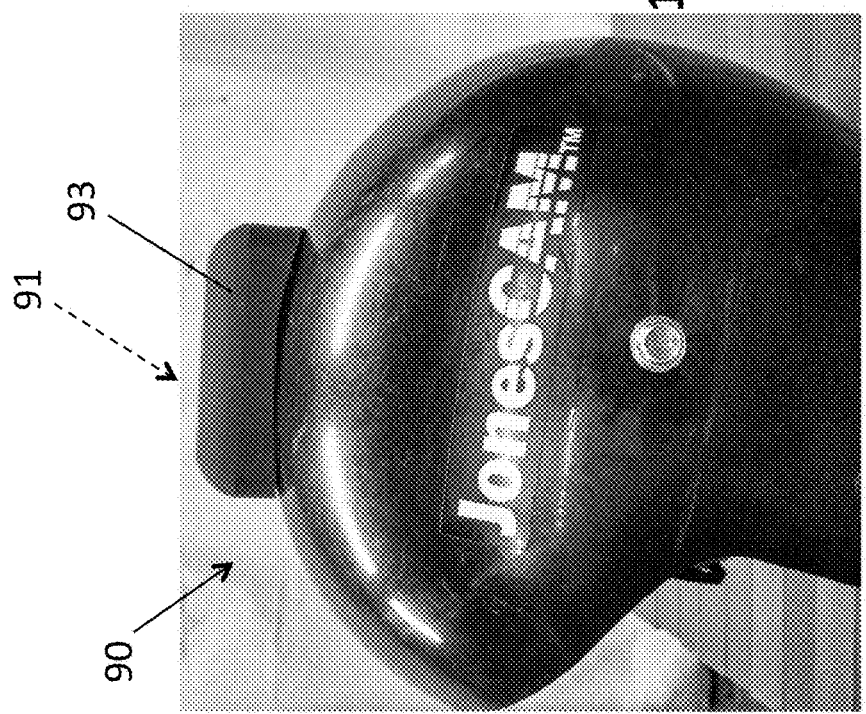

IMAGE CAPTURING SYSTEM AND METHOD OF USE

CROSS-REFERENCE TO RELATED APPLICATIONS

This application claims the benefit of U.S. Provisional Patent Application No. 61/744,155, filed Sep. 19, 2012; and U.S. Provisional Patent Application No. 61/796,407, filed Nov. 11, 2012, the disclosures of which are incorporated by referenced herein in their entirety.

BACKGROUND OF THE INVENTION

Technical Field

The present invention generally relates to image capturing systems, for example, employing optical sensors, cameras, and the like. More particularly, the present invention relates to image capturing systems and methods of capturing images for use in contact prone environments and/or non-contact environments.

Description of Related Art

In the art of image capture, for example, dynamic image capture, existing technology, for example, employing miniature cameras, is prone to damage or injury of the user or others around the user due to high profile, general bulk, mounting methods, and typical exposure of the components to contact and impact. Accordingly, especially when such components are mounted or in contact with fragile or damageable surfaces, such as, the human body, existing imaging systems can transfer loads to the surfaces or injure or harm the user and others near the user.

Imaging systems mounted to head gear, for example, helmets, are a typical concern in the art. The addition of accessories, such as, as cameras, to helmets in contact sports, recreational sports, and contact and non-contact work environments can undesirably expose the helmet wearer to increased opportunity for injury to users and those around the users. The use of prior art imagining systems on helmets in contact prone, recreational sports, and work environments can increase the wearer's potential for head, neck, and body injury, as well as, though less significant, to potential damage to the helmet.

In addition, typical existing image capture systems do not or cannot adhere to existing or pending impact and safety standards, for example ASTM, DOT, and/or NOCSAE ND002 standards, that make the existing image capture systems unsuitable for use in certain fields.

Aspects of the present invention address these and other disadvantages of the prior art and present improvements over the prior art.

SUMMARY OF THE INVENTION

The present invention, in its many aspects, provides image capturing systems and methods of capturing images that overcome the disadvantages of the prior art. Specifically, aspects of the present provide components mounted in housings having reduced profile and thus reduced susceptibility to contact. Aspects of the present invention also provide housings having mountings and/or footprints and/or the material contacting the surface mounted to that minimize or eliminate the transmission of contact loads and impacts on the housing to the underlying surface, for example, to the surface of a helmet, the surface of other apparel, or the surface of a structure to which the imaging system is mounted.

Accordingly, one embodiment of the invention is an image capturing system comprising or including at least one optical sensor adapted to receive optical images and convert the optical images to electrical signals corresponding to the optical images; an output device adapted to receive the electrical signals from the at least one optical sensor and transmit a signal corresponding to the optical images to a receiver; and a housing adapted to retain the least one optical sensor and the output device, the housing adapted to mount to a surface; wherein the housing comprises a footprint at least partially in contact with the surface; and wherein a size and/or shape of the footprint and/or a surface interface (or contact) material are selected to distribute a force on the housing through the footprint and/or the surface interface material to attenuate a force transmitted to the surface through the housing. In one aspect, the housing comprises a height above the surface that minimizes exposure to contact. In another aspect, the housing is mounted to the surface wherein the housing detaches from the surface when the housing is exposed to a predetermined force, for example, the profile of the housing above the surface that minimizes exposure contact comprises a height of the housing above the surface of at most 25 millimeters [mm], preferably at most 10 mm.

According to one aspect, the footprint may comprise a dimension, for example, a length, width, or diameter, and the dimension of the footprint is at least 1.5 times greater than a largest lateral dimension of the at least one optical sensor, or at least 3 times greater, or even at least 5 times greater.

In one aspect, the surface to which the housing may be mounted may be the surface of a headgear, for example, a helmet, such as, a sport helmet or safety helmet. In one aspect, the size of the footprint is selected to distribute the force on the housing through the footprint to attenuate a force transmitted to the surface of the head gear.

Another embodiment of the invention is a method of capturing images comprising or including providing a housing having a footprint adapted to mount to a surface; selecting a dimension of the footprint of the housing to attenuate transfer of a force from the housing to the surface; positioning at least one optical sensor adapted to receive optical images and convert the optical images to electrical signals corresponding to the optical images and an output device adapted to receive the electrical signals from the at least one optical sensor and transmit a signal corresponding to the optical images to a receiver in a housing; mounting the housing having the at least one optical sensor and the output device on the surface; capturing optical signals with the at last one optical sensor; transmitting the signal corresponding to the captured optical images to a receiver; and when the housing is contacted by the force, allowing the footprint of the housing having the selected dimension attenuate the force transmitted by the housing to the surface. In one aspect, the housing further comprises a height above the surface, and wherein the method further comprises selecting a height of the housing to minimize exposure of the housing to contact. In another aspect, mounting the housing on the surface comprises mounting the housing on the surface wherein the housing detaches from the surface when the housing is exposed to a predetermined force; and the method further comprises, when the housing is exposed to a force greater than the predetermined force, allowing the housing to detach from the surface. According to a further aspect, the at least one optical sensor comprises a largest lateral dimension, such as, a diameter or width, and selecting the dimension of the footprint comprises selecting the dimension of the footprint at least 1.5 times greater than the largest lateral dimension of the at least one optical sensor, or at least 3 times greater, or even at least 5 times greater.

A further embodiment of the invention is an image capturing system comprising or including a housing adapted to mount to head gear, the housing having a footprint adapted to minimize transfer of impact loading on the housing to the head of a wearer of the head gear; and at least one optical sensor mounted in the housing, the at least one optical sensor adapted to receive optical images and convert the optical images to electrical signals corresponding to the optical images; wherein the footprint adapted to minimize the transfer of impact loading on the housing to the head of a wearer of the head gear comprises a footprint having a width at least 1.5 times a width of the at least one optical sensor or at least 3 times a width, or even at least 5 times a width. In one aspect, the footprint of the housing comprises a circular footprint; and wherein the width of the footprint comprises a diameter of the circular footprint. In another aspect, the circular housing comprises a maximum thickness at a center of the circular housing and a thickness that varies from the maximum thickness with radial distance from the center of the circular housing.

A still further embodiment of the invention is an image capturing system comprising or including at least one optical sensor mounted in head gear, the at least one optical sensor adapted to receive optical images and convert the optical images to electrical signals corresponding to the optical images; wherein the least one optical sensor when mounted in the head gear does not protrude beyond the surface of the head gear and is not exposed to impact loading.

A further embodiment of the invention is an image capturing system comprising or including a substrate adapted to mount to head gear, the substrate having a footprint adapted to minimize a transfer of impact loading on the system to the head of a wearer of the head gear; at least one optical sensor mounted in the substrate, the at least one optical sensor adapted to receive optical images and convert the optical images to electrical signals corresponding to the optical images; and at least one electrical component, different from the at least one optical sensor, adapted to interface with the at least one optical sensor; wherein the at least one optical sensor and the at least one electrical component have a height above a surface of the head gear that minimizes the exposure of the at least one optical sensor and the at least one electrical component to lateral impacts. In one aspect, the footprint adapted to minimize the transfer of impact loading on the housing to the head of a wearer of the head gear comprises a footprint having a width at least 1.5 times a greatest width of the at least one optical sensor, preferably, at least 3 times the greatest width of the at least one optical sensor, or even at least 5 times greatest width.

A still further embodiment of the invention is a method for protecting a image capturing device, the method comprising or including mounting a first substantially transparent strip of film in front of an aperture of the image capturing device, wherein the first substantially transparent strip of film at least partially shields the aperture from ambient environment; when the substantially transparent strip of film becomes at least partially obstructed by foreign matter from the ambient environment, displacing the first substantially transparent film from in front of the aperture; and exposing a second substantially transparent film to the ambient environment in front of the aperture of the image capturing device, wherein the second substantially transparent film at least partially shields the aperture from the ambient environment. In one aspect, the mounting the first substantially transparent film in front of the aperture comprises mounting at least a portion of a substantially continuous strip of substantially transparent film in front of the aperture; and wherein displacing the first substantially transparent film and exposing the second substantially transparent film to the ambient environment in front of the aperture comprises translating the substantially continuous strip of substantially transparent film across a field of view of the aperture. In another aspect, the mounting at least a portion of the substantially continuous strip of substantially transparent film in front of the aperture comprises providing a source roller for substantially transparent film and a take-up roller for substantially transparent film; and wherein translating the substantially continuous strip of substantially transparent film across a field of view of the aperture comprises translating the substantially continuous strip of substantially transparent film from the source roller to the make-up roller. In another aspect, translating the substantially continuous strip of substantially transparent film from the source roller to the take-up roller comprises passing the substantially continuous strip of substantially transparent film about at least one idler roller.

According to another aspect, mounting the first substantially transparent strip of film in front of the aperture comprises mounting a plurality of individual sequentially-positioned substantially transparent strips of film in front of the aperture; and wherein displacing the first substantially transparent strip of film and exposing the second substantially transparent strip of film comprises displacing the first substantially transparent strip of film from in front of the aperture to expose the second substantially transparent strip of film. In one aspect, displacing the first substantially transparent strip of film from in front of the aperture to expose the second substantially transparent strip of film comprises pulling at least one cord operatively connected to the first substantially transparent strip of film. In another aspect, pulling at least one cord operatively connected to the first substantially transparent strip of film comprises manually pulling or automatedly pulling the first substantially transparent strip of film.

Another embodiment of the invention is an apparatus for protecting a image capturing device, the apparatus comprising or including a first substantially transparent strip of film and a second substantially transparent strip of film each adapted to be positioned in front of an aperture of the image capturing device, wherein the first substantially transparent strip of film and the second substantially transparent strip of film, when positioned in front of an aperture, each at least partially shield the aperture from ambient environment; means for displacing the first substantially transparent strip of film from in front of the aperture when the substantially transparent strip of film becomes at least partially obstructed by foreign matter from the ambient environment; and means for exposing the second substantially transparent strip of film to the ambient environment in front of the aperture of the image capturing device, wherein the second substantially transparent strip of film at least partially shields the aperture from the ambient environment. In one aspect, the first substantially transparent strip of film and the second substantially transparent strip of film each comprise portions of a substantially continuous strip of substantially transparent film; and wherein the means for displacing the first substantially transparent strip of film and the means for exposing the second substantially transparent strip of film may comprise means for translating the substantially continuous strip of substantially transparent film across a field of view of the aperture. In another aspect, the means for translating the substantially continuous strip of film may comprise a source roller for the substantially transparent film and a take-up roller for the substantially continuous strip of substantially transparent film. In another aspect, apparatus may further comprises at least one idler roller, but typically, at least two idler rollers, adapted to contact the substantially continuous strip of substantially transparent film between the source roller the make-up roller.

In another aspect, the first substantially transparent strip of film may comprises one strip of film of a plurality of individual sequentally-positioned substantially transparent strips of film and the second substantially transparent strip of film may comprise another strip of film of the plurality of individual sequentally-positioned substantially transparent strips of film; and wherein the means for displacing the first substantially transparent strip of film and the means for exposing the second substantially transparent strip of film may comprise means for displacing the one strip of film to expose the another strip of film. In one aspect, the means for displacing the one strip of film may comprise at least one cord operatively connected to the one strip of film. In another aspect, the apparatus may further comprise means for manually pulling or automatedly pulling the one strip of film.

These and other aspects, features, and advantages of this invention will become apparent from the following detailed description of the various aspects of the invention taken in conjunction with the accompanying drawings.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

FIG. 4 is a top perspective view of a piece of head gear having an image capturing system according to one aspect of the invention.

FIG. 5 is a schematic side elevation view of the image capturing system shown in FIG. 4.

FIG. 6 is a schematic top plan view of the image capturing system shown in FIG. 4.

FIG. 7 is a schematic cross sectional view of the image capturing system shown in FIG. 4 as viewed along section lines 7-7 in FIG. 6.

FIG. 8 is a side elevation view of a piece of head gear having an image capturing system according to another aspect of the invention.

FIG. 9 is a schematic side elevation view of the image capturing system shown in FIG. 8.

FIG. 10 is a schematic top plan view of the image capturing system shown in FIG. 8.

DETAILED DESCRIPTION OF ASPECTS OF THE INVENTION

Figure 1:
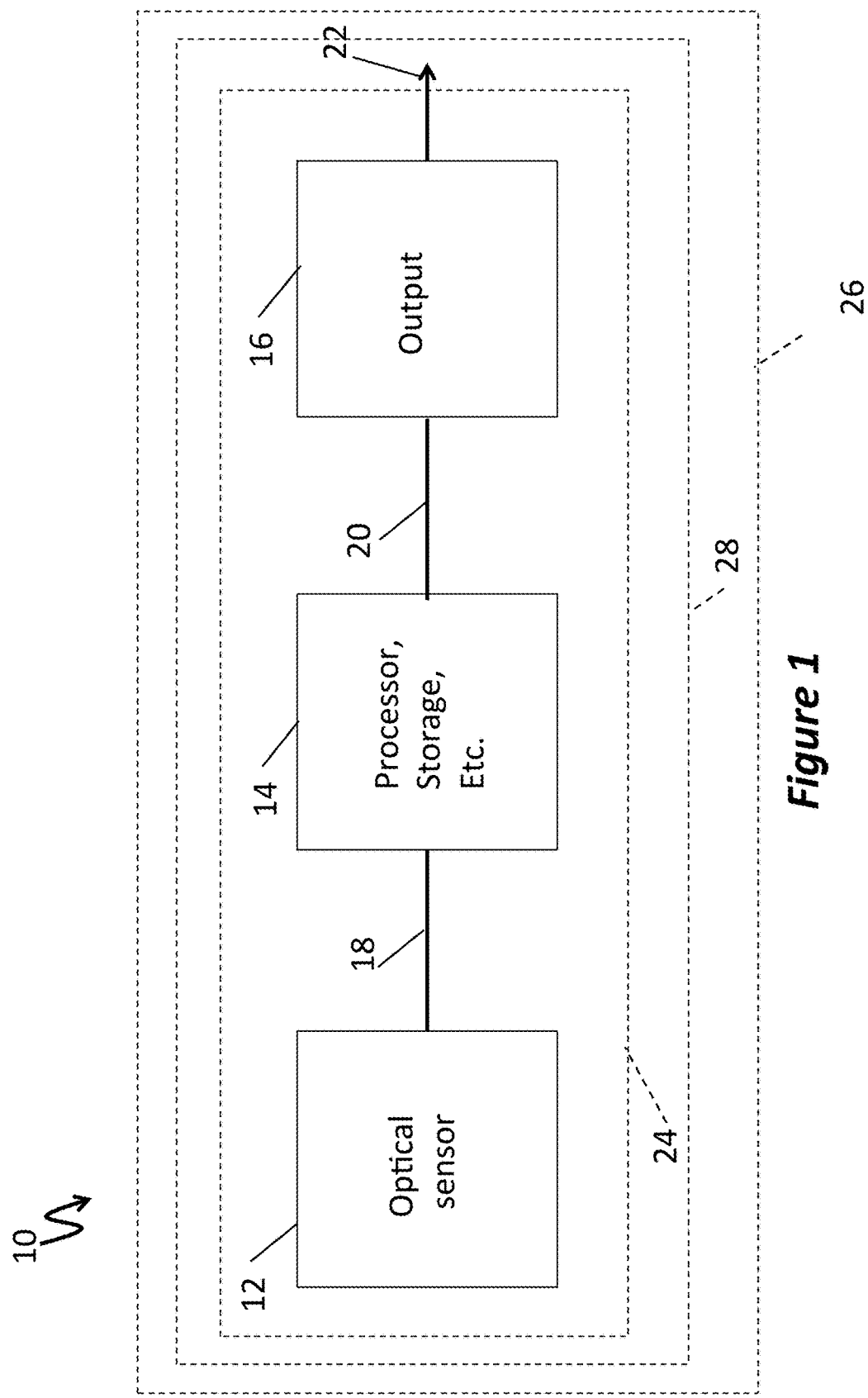
FIG. 1 is a schematic block diagram of one image capturing system according to one aspect of the invention.

FIG. 1 is a schematic block diagram of one image capturing system 10 according to one aspect of the invention. As shown in FIG. 1, system 10 may typically include one or more optical sensors 12, one or more electronic components 14, and one or more output devices 16. As shown, the one or more electronic components typically communicate with optical sensor 12 via one or more electrical connections 18; and the one or more electronic components typically communicate with output device 16 via one or more electrical connections 20. As also shown in FIG. 1, the components of system 10 may be mounted on a common platform or substrate 24, for example, a flexible printed circuit board (PCB) and the like. In addition, though electrical connections 18 and 20 are shown as distinct electrical connections, it will understood by those in the art that electrical connections 18 and 20 may be imbedded in or mounted on substrate 24. According to aspects of the present invention, as will be discussed in more detail below, system 10 may typically be mounted on a surface 26, for example, a surface of head gear, apparel, equipment, sporting goods, animals, animal harnesses, and the like whereby the optical sensor 12 captures images, for example, still digital images or substantially continuous video images, and via components 14 and output device 16 transmits the captured images for local or remote viewing and/or storage. As will also be illustrated below, in one aspect, system 10 may be mounted in or comprise a housing 28, for example, a housing adapted to mount to surface 26.

According to one aspect of the invention, system 10 is adapted to minimize or prevent injury or damage to the surface 26 to which system 10 is mounted. Features such as having low exposed profile or a relatively large footprint minimize the likelihood of transmitting and/or attenuate the transmission of applied force or load to surface 26. Specially, when surface 26 comprises head gear, apparel, or other clothing or equipment worn by a human operator, aspects of system 10 are adapted to minimize or prevent exposure to and/or the transmission of loads, for example, impact loads, to the human operator, for example, to the head of the human operator and/or surface 26. For example, aspects of the present invention are designed to adhere to respective industry safety standards, for instance, American Society of Testing and Materials (ASTM) standards, NOC-SAE ND002 standards or Department of Transpiration (DOT) standards, among others, to ensure the safety of any human or non-human operators of system 10.

In one aspect of the invention, optical sensor 12 may be any device adapted to receive optical images, not shown, and convert the received images to an electrical signal, for example, a digital electrical signal. In one aspect, optical sensor 12 may be a an image sensor comprising one or more integrated circuits having an array optical sensors (for example, an array of "pixel" sensors) having a photo detectors. For example, in one aspect optical sensor 12 may comprise one or more "CMOS sensors" as known in the art; according to this aspect, optical sensor 12 may be referred to as a "CMOS module." In one aspect, optical sensor 12 may be a high megapixel CMOS sensor, for example, as provided by the conventional sensor art. In another aspect, optical sensor 12 may comprise one or more charge-coupled device (CCD) image sensors.

In another aspect, of the invention, optical sensor 12 may be a camera, for example, a bullet-type camera, for instance, a camera available from P.O.V., LLC, such as, a JonesCAM ION HD Advantage bullet-type camera or its equivalent. The camera, for example, a miniature camera, may typically be water proof or at least water resistant, for instance, having appropriate sealing features or devices that limits or prevents the ingress of water into the camera, even under pressure, for example, the water pressure typically experienced during skin diving or scuba diving.

Though, as shown in FIG. 1, optical sensor 12 may be mounted to substrate 24, in one aspect, optical sensor 12 may not be mounted to substrate 24 but may be connected to one or components on substrate 24 via electrical connection 18, for example, a flexible ribbon cable. Having the capacity to locate optical sensor remote substrate 24, for example, in the hand of a user or on a surface different from surface 26, increases the adaptability and versatility of using aspects of the invention According to aspects of the invention, optical sensor 12 may include one or more lenses (not shown) adapted to enhance the optical image. The one or more lenses may be adapted to vary the focal length of optical sensor 12, for example, manually or automatedly, for instance, by use of motor driven lens mount. The function of the one or more lenses may be enhanced by the addition of polarizing filters, tinting filters, among other enhancements, and the use of a protective, for example, water proof, lens covers.

In another aspect of the invention, optical sensor 12 may be adapted to vary the direction of the field of vision of the optical sensor 12. For example, in one aspect, the direction and/or orientation of the optical sensor 12 can be varied, for example, manually or automatedly panning the field of view, for instance, by use of motor driven sensor mount. According to one aspect of the invention, this varying direction and/or orientation of optical sensor 12 may be referred to as an "articulating" optical sensor. Manual or automated zooming of the field of view, for instance, by use of motor driven sensor mount, may also be provided. In one aspect, the user may vary focal length of the lens of optic sensor 12 by replacing one lens of one focal length with another lens of a different focal length. In another aspect, the lens of the optical sensor may be adapted to vary the direction of the field of vision of the optical sensor 12. For example, in one aspect, the direction and/or orientation of the lens can be varied, for example, manually or automatedly, for instance, by use of motor driven lens mount. Optical sensor 12 may be stabilized, for example, gyroscopically stabilized and/or digitally stabilized or controlled to minimize or prevent erratic or discontinuous optical sensing and/or transmission of signals.

According to aspects of the invention, electrical components 14 may be any devices adapted to receive electrical signals from optical sensor 12 and modify, enhance, store, or otherwise manipulate the electrical signals received and provide the manipulated signals to be received by output device 16. In one aspect, electrical components 14 may include one or more integrated circuits (ICs), for example, one or more processors and/or storage or recording devices. In one aspect, electrical components 14 may include a power supply, for example, one or more batteries, adapted to power system 10. In one aspect, the batteries used in system 10 may flexible batteries, that is, batteries having some flexibility that can conform to the shape of substrate 24 and/or surface 26. In one aspect, system 10 may be powered by an external power source, such as, an external batteries or line power from the electrical grid, for example, hardwired to system 10. In another aspect, system 10 may be powered by photovoltaic cells or fuel cells, for example, mounted to housing 28 or mounted adjacent to housing 28.

According to aspects of the invention, output device 16 may be any device adapted to receive electrical signals from electrical components 14, and, with or without modification, output a signal 22 associated with the optical signal received be optical sensor 12. Output device 16 may be adapted to transmit electrical signals, wired or wirelessly, via any conventional communication protocol or medium, for example, via a cellular signal (for instance, 3G, 4G, 5G, etc.), via Wi-Fi, via High-Definition Multimedia Interface (HDMI), WHMI microwave transmission, Bluetooth, USB 2.0/3.0, Ethernet, among others. Output device 16 may include interfaces for one or more of these modes of transmission, for example, having multiple ports, for instance, having multiple ports stacked one above the other or lying adjacent to each other. The output signal 22 may be encrypted. In one aspect, output device 16 may transmit signal 22 over a cable or wire, that is, hardwired output, to storage device or for transmission, for example, wireless transmission. For example, in one aspect, output device 16 may transmit electrical signals to a storage device or recorder mounted near output device 16, for example, a smart phone or other device mounted somewhere within the network or on the user of system 10.

Electrical connections 18 and 20, among others, between components in system 10 may be conventional, for example, electrical connections 18 and 20 may comprise cable or wire, and may be embedded in substrate 24. In one aspect, electrical connections 18 and 20 may be flexible connections, for example flexible multi-wire connectors, for instance, flexible "ribbon" connectors.

Substrate 24 shown in FIG. 1 may be one or more substrates adapted to retain optical sensor 12, components 14, and output device 16, for example, on a surface 26. According to one aspect of the invention, the one or more substrates 24 may be flexible, for example, non-rigid, where the substrate 24 may conform to the contour or shape of surface 26, for example, a surface 26 that may not be planar, and may be irregular in shape. In one aspect, substrate 24 may be a printed circuit board (PCB), for example, a rigid or a flexible PCB.

Housing 28 may also be rigid or flexible, for example, to conformable to the shape of surface 26 while retaining system 10. In one aspect, housing 28 may be one or more housings interconnected by electrical connections 18, 20, and others, for example, flexible ribbon cables. Housing 28 may typically be water resistant or waterproof. In one aspect, housing 28 may comprise a potting or coating of the components of system 10, for example, an elastomeric or rubber coating to provide flexibility and/or water resistance to housing 28.

In one aspect of the invention, the housing 28 may be attached under the visor of a helmet, which may greatly reduce the exposure to the housing 28 and the optic device to impact by debris, while allowing the user to maintain an image of the desired field of view. For example, when a user lowers the user's head in a natural reaction to debris, for example, debris (or "roost") generated by, for example, other bicycle or motorcycle race competitors, the user may still maintain a forward display using aspects of the invention, even though the user's head is lowered. For instance, while confronted with "roost," the user may still maintain an image of the forward field of view (FOV) received and transmitted to a video display by aspects of the invention. In one aspect, the video display on aspects of the invention may be "flipped," for example, manually by the user or automatedly via image capture controls, into the line of sight of the user prior to engaging the oncoming debris.

According to aspects of the invention housing 28 may be mounted to surface 26 by conventional means, for example, by means of mechanical fasteners, adhesives, and the like. However, in one aspect, housing 28, and other housings disclosed herein, may be mounted to surface 26, and other surfaces disclosed herein, in order to minimize transmission of loads for example, impact or shock loading, to the surface 26 and/or to the wearer of system 10. For example, in one aspect, the mounting of housing 28 to surface 26 may be characterized as a "break-away" mounting, that is, where upon impact or loading above a specific threshold, for instance, a predetermined threshold, housing 28 may detach from surface 26 and impart little or no load to surface 26 or the wearer. In one aspect, housing 28 may be mounted to surface 26 by means of one or more hook and loop fasteners, for example, by means of Velcro brand hook an loop fasteners. In another aspect, housing 28 may be mounted to surface 26 by means of one or more suction cups or one or more release tapes. Other break-away mountings will be apparent to those of skill in the art. In other aspects of the invention, the mounting of housing 28 to surface 26 may be resilient or energy absorbing, for example, housing 28 or the mounting of housing 28 to surface 26 may comprise a resilient, cushioning, or energy absorbing material, such as, an elastomer or foam rubber, that is capable of absorbing at least some of the loading, for example, shock or impact loading that may be experienced by housings 28 and minimize or prevent any load transmission to surface 26 or a wearer. In contrast, in other aspects of the invention, housing 28, and other housings disclosed herein, may be substantially rigidly mounted to surface 26, that is, where housing 28 is intended to not detach from surface 26 under the expected operating environment.

Figure 3:
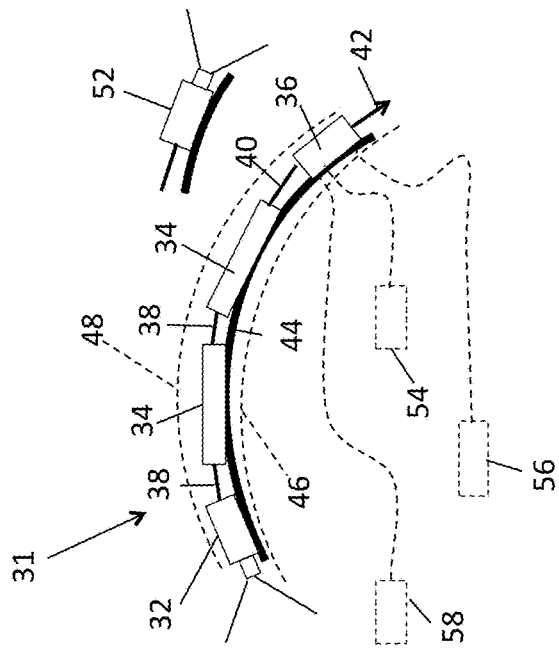
FIG. 3 is a schematic side elevation view of the image capturing system shown in FIG. 2.
Figure 2:
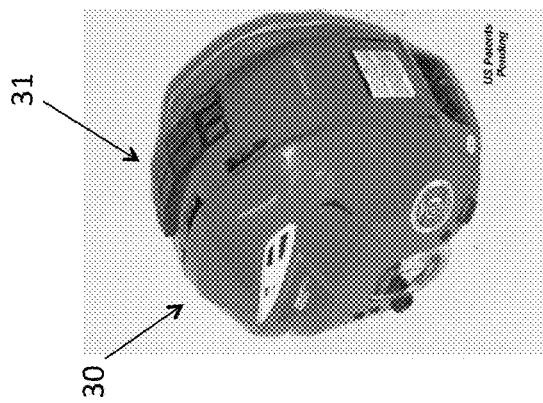
FIG. 2 is a rear perspective view of a piece of head gear having an image capturing system according to one aspect of the invention.

FIG. 2 is a rear perspective view of a piece of head gear 30 having an image capturing system 32 according to one aspect of the invention. In the aspect shown in FIG. 2, the head gear 30 comprises a hockey helmet, though aspects of the invention may be used for a broad range of head gear. FIG. 3 is a schematic side elevation view of the image capturing system 32 shown in FIG. 2.

As shown in FIG. 3, in a fashion similar to system 10 shown in FIG. 1, system 31 may typically include one or more optical sensors 32, one or more electronic components 34, and one or more output devices 36, adapted to output an signal 42. As shown, the one or more electronic components typically communicate with optical sensor 32 via one or more electrical connections 38; and the one or more electronic components 34 typically communicate with output device 36 via one or more electrical connections 40. As also shown in FIG. 3, the components of system 31 may be mounted on a common platform or substrate 44, for example, a flexible printed circuit board (PCB) and the like. According to the aspect of the invention shown in FIG. 3, optical sensors 32, one or more electronic components 34, and one or more output devices 36 may have all the attributes of the corresponding components described above with respect to system 10. For example, optical sensor 32 may be a CMOS sensor. In addition, the one or more electrical connections 38 and 40 may have all the attributes of connections 18 and 20 of system 10. For example, electrical connections 38 and 40 may be flexible, multi-element ribbon cables.

As shown in phantom in FIG. 3, system 31 may be mounted on top of external surface 46 (system 31 may also be mounted on a side) of head gear 30 or within or below the cover or shell 48 of head gear 30. Though not shown in FIG. 2, when system 31 is mounted within the shell 48 of head gear 30, one or more apertures of openings may be provide in shell 48 to expose one or more optical sensors 32. In addition, though not shown in FIG. 3, when system 31 is mounted within the shell 48 of head gear 30, appropriate cushioning and/or support may typically be provided to isolate system 31 from the head of the wearer of head gear 30, for example, padding, strapping, webbing, high impact absorbing foams (soft or rigid) and gel-type materials, encased fluids (for example, a fluid encased in tubes or cells), above helmet webbing but inside head gear shell/housing, combinations thereof, or any material having energy absorption properties that is capable of absorbing and/or displacing an external shock, impact, or other forces. According to aspect of the invention, when appropriate internal cushioning is provided, system 31 and its components may be isolated, concealed or otherwise embedded within or among the cushioning, for example, in interfaces or pockets between padding, to prevent contact with the wearer or damage to system 31.

System 31 shown in FIG. 3 also illustrates aspects of the invention that may be provided in system 31 or for any other aspects of the invention disclosed herein. For example, in one aspect, system 31 may include one or more optical sensors 52 directed in substantially the same or a different direction than optical sensor 32. Optical sensor 52 may have all the attributes of optical sensors 12 and 32, for example optical sensor 52 may be a CMOS sensor and may be articulating. Optical sensor 52 may typically interface with one or more other components in system 31 by electrical connection 53, for example, a flexible ribbon cable. Optical sensor 52 may also be mounted on common or different substrate 44. Optical sensor 52 may be directed in substantially the same direction as optical sensor 32 for example, optical sensor 52 may be mounted or stacked on top of optical sensor 32 or optical sensor 52 may be positioned adjacent to optical sensor 32. In one aspect, optical sensor 52 may be directed in a substantially opposite direction of optical sensor 32, for example, one sensor directed in the direction of travel and the other directed in the opposite direction. According to this aspect of the invention, system 31 may include some form of synchronization or timing device, for example, among components 34, adapted to synchronize the images captured by optical device 32 and optical device 52.

As also shown in FIG. 3, system 31 may also include the following components that may also be provided for any other aspects of the invention disclosed herein. System 31 may include an earphone 54, for example, adapted to be appropriately positioned within or adjacent to head gear 30, and interface with system 31, for example, via output device 36, as shown. System 31 may include a microphone 56, for example, adapted to be appropriately positioned within or adjacent to head gear 30, and interface with system 31, for example, via output device 36, as shown. Microphone 56 may be adapted to detect the voice of a user or ambient noise and sounds. System 31 may be adapted to record the audio signal detected and/or transmit the audio signal, for example, via outlet device 36. System 31 may also be adapted to respond to voice commands, for example, voice commands detected by microphone 56. System 31 may include an display and/or indicator 58, for example, an display, alarm, sound or light, adapted to be appropriately positioned within or adjacent to head gear 30 for viewing or hearing by the wearer of head gear 30, and interface with system 31, for example, via output device 36, as shown. Indicator 58 may be positioned to be protected from the elements, for example, rain or snow; for instance, indicator 58 may be positioned beneath a visor or sun shade (not shown). Indicator 58 may be heads-up display, for example, displaying images captured by optical sensor 32 and/or 52; an alarm indicating, for example, low battery power or a damaged or malfunctioning component; an indicator of the mode of operation of system 31, for example, recording or downloading data; a visual indicator, for example, one or more light-emitting diodes (LED) visible to the user and/or illuminating the user's field of view, among other things. Aspects of the invention may also transmit information to remote devices, for example, to a phone, laptop computer, a wireless receiver, to a network, a remote control, a smart watch, or an automated wristband, among other remote devices.

System 31 shown in FIGS. 2 and 3 comprises a "low profile," that is, the physical shape and size of the components of system 31 provide a minimal projection above the external surface of head gear 30, for example, 25 mm or less, but typically 10 mm or less projection above the external surface of head gear 30. According to this aspect of the invention, system 31 and the systems and housings disclosed herein may be characterized as having a low profile where the potential for contact or impact by external forces may be minimized or eliminated. In addition, the low profile of system 31 and other systems and housings disclosed herein may also enhance the aesthetic appeal of aspects of the invention by minimizing their conspicuousness to observers. Moreover, the low profile of aspects of the present invention provides a streamlined, aerodynamic surface and appearance, thus minimizing fluid flow resistance, such as, air resistance, to aspects of the invention while providing an aesthetically appealing appearance. Still further, the relatively broad foot print of system 31 (see FIG. 2), and other systems and housings disclosed herein, may also attenuate and/or minimize the transmission of loads, for example, impact loads, that may contact system 31 and other systems discloses herein. Specifically, aspects of the present invention may attenuate and/or minimize the transfer of impact to the head of the wearer of head gear having a image capturing system 31, and other systems and housings disclosed herein.

FIG. 4 is a top perspective view of a piece of head gear 60 having an image capturing system 61 mounted inside a housing 63 according to one aspect of the invention. FIG. 5 is a schematic side elevation view of the image capturing system 61 and housing 63 shown in FIG. 4. FIG. 6 is a schematic top plan view of the image capturing 61 system and housing 63 shown in FIG. 4 and FIG. 7 is a schematic cross sectional view of the image capturing system 61 and housing 63 shown in FIG. 4 as viewed along section lines 7-7 in FIG. 6.

As shown most clearly in the cross section of FIG. 7, system 61—in a fashion similar to system 10 shown in FIG. 1 and system 31 shown in FIG. 2-3—may typically include one or more optical sensors 62, one or more electronic components 64, and one or more output devices 66, adapted to output a signal. As shown, the one or more electronic components 64 typically communicate with optical sensor 62 via one or more electrical connections 68; and the one or more electronic components 64 typically communicate with output device 66 via one or more electrical connections 70. As also shown in FIG. 7, the components of system 61 may be mounted on a common platform or substrate, for example, a flexible printed circuit board (PCB) and the like. According to the aspect of the invention shown in FIG. 7, optical sensors 62, one or more electronic components 64, and one or more output devices 66 may have all the attributes of the corresponding components described above with respect to system 10. For example, optical sensor 62 may be a CMOS sensor, for instance, an articulating CMOS sensor. In addition, the one or more electrical connections 68 and 70 may have all the attributes of connections 18 and 20 of system 10. For example, electrical connections 68 and 70 may be flexible, multi-element ribbon cables.

As shown in FIGS. 4-7, system 61 may typically be mounted in a housing 63, for example, in a cavity 65 within housing 63, and housing 63 may be mounted on top of external surface 76 of head gear 60 or within or below the cover or shell of head gear 60. As shown, one or more apertures or openings 67 may typically be provided in housing 63 to allow access to optical sensor 62. Though not shown in FIG. 4-7, when system 61 is mounted within the shell of head gear 60, appropriate padding and/or support may typically be provided to isolate system 61 from the head of the wearer of head gear 60.

FIGS. 4-7 also illustrate aspects of the invention that may be provided in system 61 or for any other aspects of the invention disclosed herein. For example, in one aspect, system 61 may include one or more optical sensors 82 (shown in phantom) positioned in an aperture or opening and directed in a different direction than optical sensor 62. Optical sensor 82 may have all the attributes of optical sensors 12, 32, and 62 for example optical sensor 82 may be a CMOS sensor and may be articulating. Optical sensor 82 may typically interface with one or more other components in system 61 by electrical connection for example, a flexible ribbon cable. Optical sensor 82 may also be mounted on common or different substrate than optical sensor 62. In one aspect, optical sensor 82 may be directed in a substantially opposite direction of optical sensor 62, for example, one sensor directed in the direction of travel and the other directed in the opposite direction. According to this aspect of the invention, system 61 may include some form of synchronization or timing device, for example, among components 64, adapted to synchronize the images captured by optical device 62 and optical device 82.

As also shown in FIG. 4-6, system 61 may also one or more actuation buttons or switches 84, for example, adapted to provide a user interface with system 61, for example, an on/off button or switch, stop and start recording, recording resolution and speed, light operation (for example, LED light or laser light operation), taking of still camera pictures, optic sensor control, for example, to vary the contrast, brightness, etc. of the image being detected and, for example viewed on display and/or indicator 58.

System 61 in housing 63 shown in FIGS. 4 through 7 may also comprises a "low profile," that is, the physical shape and size of the components of system 61 and housing 63 provide a minimal projection above the external surface of head gear 60, for example, 25 mm or less, but typically 10 mm or less projection above the external surface of head gear 60. According to this aspect of the invention, housing 63 and the housings disclosed herein may be characterized as having a low profile where the potential for contact or impact by external forces with housing 63 may be minimized or eliminated. In addition, the low profile of housing 63 and other housings disclosed herein may also enhance the aesthetic appeal of aspects of the invention by minimizing their conspicuousness to observers. Moreover, the low profile of housing 63 provides a streamlined surface and appearance, thus minimizing fluid flow resistance, such as, air resistance, to aspects of the invention while providing an aesthetically appealing appearance. Still further, the relatively broad foot print of housing 63 (see FIG. 2), and other systems and housings disclosed herein, may also attenuate and/or minimize the transmission of loads, for example, impact loads, that may contact system 31 and other systems discloses herein. According one aspect of the invention, housing 63 comprises a footprint that is much larger than a footprint of a housing sized based upon the size of the components of system 61 alone. Though the components of system 61 may be enclosed in a housing have a much smaller footprint, the footprint of housing 63, and other housings disclosed herein, may be provided to attenuate loading, for example, attenuate impact loading upon the wearer of head gear 60. In one aspect, a dimension, for example, diameter 69, of housing 63 may be at least 1.5 times the width of the largest component of system 61, for example, the diameter or width 71 of optical sensor 62. In another aspect, a dimension, for example, diameter 69 of housing 63 may be at least 4 times the width of the largest component of system 61, or 5 times the width, or 6 times, or 10 times the width of the largest component of system 61. Specifically, aspects of the present invention may attenuate and/or minimize the transfer of impact to the head of the wearer of head gear having an image capturing system 61, and other systems and housings disclosed herein.

Figure 11:
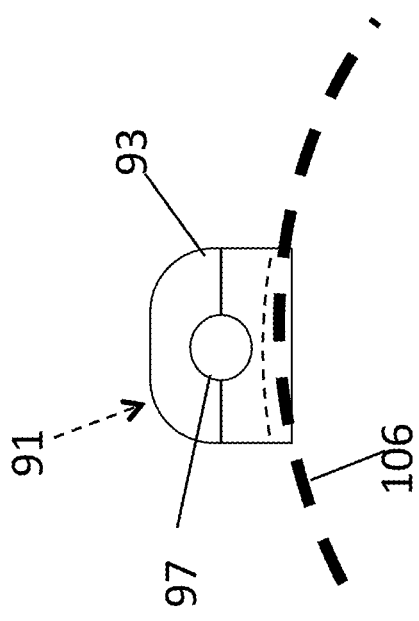
FIG. 11 is a schematic front elevation view of the image capturing system shown in FIG. 8.

FIG. 8 is a side elevation view of a piece of head gear 90 having an image capturing system 91 in a housing 93 according to another aspect of the invention. FIG. 9 is a schematic side elevation view of the image capturing system 91 in housing 93 shown in FIG. 8. FIG. 10 is a schematic top plan view of the image capturing system 91 in housing 93 shown in FIG. 8. FIG. 11 is a schematic front elevation view of the image capturing system 91 in housing 93 shown in FIG. 8 and FIG. 12 is a schematic cross sectional view of the image capturing system 91 in housing 93 shown in FIG. 8 as viewed along section lines 12-12 in FIG. 10.

Figure 12:
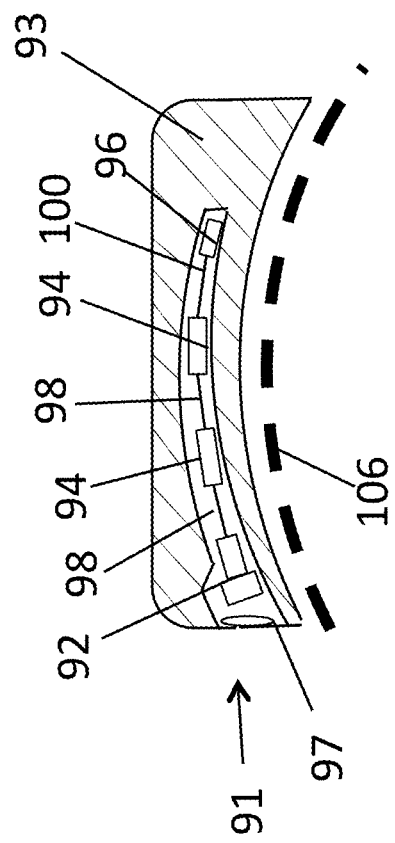
FIG. 12 is a schematic cross sectional view of the image capturing system shown in FIG. 8 as viewed along section lines 12-12 in FIG. 10.

As shown most clearly in the cross section of FIG. 12, system 91—in a fashion similar to system 10 shown in FIG. 1, system 31 shown in FIG. 2-3, and system 61 shown in FIG. 4-7—may typically include one or more optical sensors 92, one or more electronic components 94, and one or more output devices 96, adapted to output a signal. As shown, the one or more electronic components 94 typically communicate with optical sensor 92 via one or more electrical connections 98; and the one or more electronic components 94 typically communicate with output device 96 via one or more electrical connections 100. As also shown in FIG. 12, the components of system 91 may be mounted on a common platform or substrate, for example, a flexible printed circuit board (PCB) and the like. According to the aspect of the invention shown in FIG. 12, optical sensors 92, one or more electronic components 94, and one or more output devices 96 may have all the attributes of the corresponding components described above with respect to system 10 in FIG. 1. For example, optical sensor 92 may be a CMOS sensor, for instance, an articulating CMOS sensor. In addition, the one or more electrical connections 98 and 100 may have all the attributes of connections 18 and 20 of system 10. For example, electrical connections 98 and 100 may be flexible, multi-element ribbon cables.

As shown in FIGS. 8-12, system 91 may typically be mounted in a housing 93, for example, in a cavity 95 within housing 93, and housing 93 may be mounted on top of external surface 106 of head gear 90 or within or below the cover or shell of head gear 90. As shown, an aperture or opening 97 may typically be provided in housing 93 to allow access to optical sensor 92. Though not shown in FIG. 8-12, when system 91 is mounted within the shell of head gear 90, appropriate padding and/or support may typically be provided to isolate system 91 from the head of the wearer of head gear 90.

FIGS. 8-12 also illustrate aspects of the invention that may be provided in system 91 or for any other aspects of the invention disclosed herein. For example, in one aspect, system 91 may include one or more optical sensors 112 (shown in phantom) positioned in an aperture or opening and directed in a different direction than optical sensor 92. Optical sensor 112 may have all the attributes of optical sensors 12, 32, 62, and 92 for example optical sensor 112 may be a CMOS sensor and may be articulating. Optical sensor 112 may typically interface with one or more other components in system 91 by electrical connection for example, a flexible ribbon cable. Optical sensor 112 may also be mounted on common or different substrate than optical sensor 92. In one aspect, optical sensor 112 may be directed in a substantially opposite direction of optical sensor 92, for example, one sensor directed in the direction of travel and the other directed in the opposite direction. According to this aspect of the invention, system 91 may include some form of synchronization or timing device, for example, among components 94, adapted to synchronize the images captured by optical device 92 and optical device 112.

As also shown in FIG. 8-12, system 91 may also one or more actuation buttons or switches 114, for example, adapted to provide a user interface with system 91, for example, an on/off button or switch stop and start recording, recording resolution and speed, light operation (for example, LED light or laser light operation), taking of still camera pictures, optic sensor control, for example, to vary the contrast, brightness, etc. of the image being detected and, for example viewed on display and/or indicator 58.

System 91 in housing 93 shown in FIGS. 8 through 12 may also comprises a "low profile," that is, the physical shape and size of the components of system 91 and housing 93 provide a minimal projection above the external surface of head gear 90, for example, 25 mm or less, but typically 10 mm or less projection above the external surface of head gear 90. According to this aspect of the invention, housing 93 and the housings disclosed herein may be characterized as having a low profile where the potential for contact or impact by external forces with housing 93 may be minimized or eliminated. In addition, the low profile of housing 93 and other housings disclosed herein may also enhance the aesthetic appeal of aspects of the invention by minimizing their conspicuousness to observers. Moreover, the low profile of housing 93 provides a streamlined surface and appearance, thus minimizing fluid flow resistance, such as, air resistance, to aspects of the invention while providing an aesthetically appealing appearance. Still further, the relatively broad foot print of housing 93 (see FIG. 10), and other systems and housings disclosed herein, may also attenuate and/or minimize the transmission of loads, for example, impact loads, that may contact system 91 and other systems discloses herein. According one aspect of the invention, housing 93 comprises a footprint that is much larger than a footprint of a housing sized based upon the size of the components of system 91 alone. Though the components of system 91 may be enclosed in a housing have a much smaller footprint, the footprint of housing 93, and other housings disclosed herein, may be provided to attenuate loading, for example, attenuate impact loading upon the wearer of head gear 90. In one aspect, a dimension, for example, length 109, of housing 93 may be at least 1.5 times the width of the largest component of system 91, for example, the diameter or width 101 of optical sensor 92. In another aspect, a dimension, for example, length 109 of housing 63 may be at least 2 times, at least 4 times. the width of the largest component of system 91, or 5 times the width, or 6 times, or 10 times the width of the largest component of system 91. Specifically, aspects of the present invention may attenuate and/or minimize the transfer of impact to the head of the wearer of head gear having an image capturing system 91, and other systems and housings disclosed herein. The design and materials used to house components when placed on head gear may substantially create a second energy absorbing/displacing shell on the head gear in some aspect of the invention.

Figure 13A:
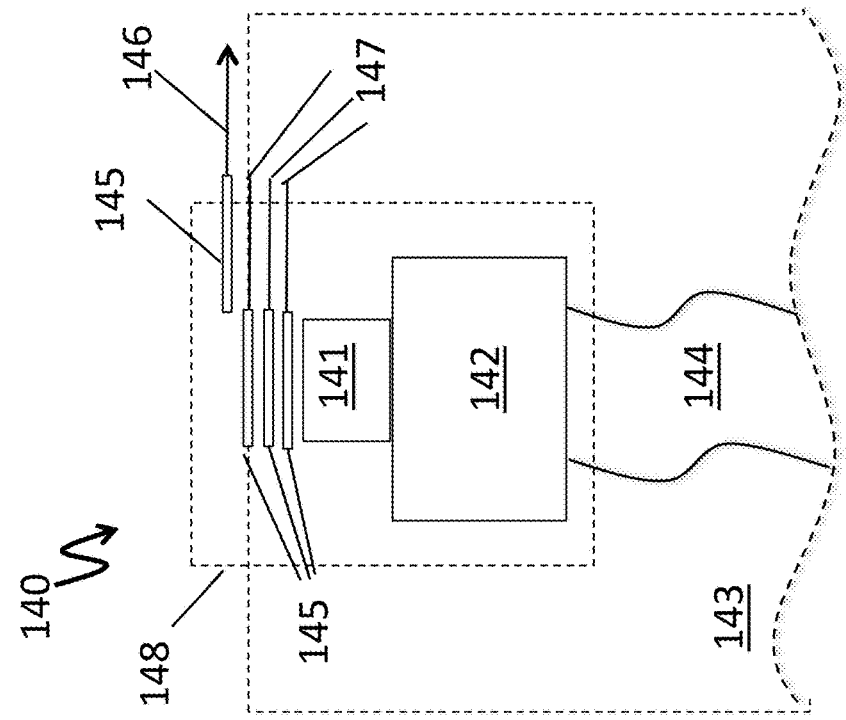
FIGS. 13A and 13B are top plan schematic views of two optical sensor lens protectors, respectively, according to further aspects of the invention.
Figure 13B:
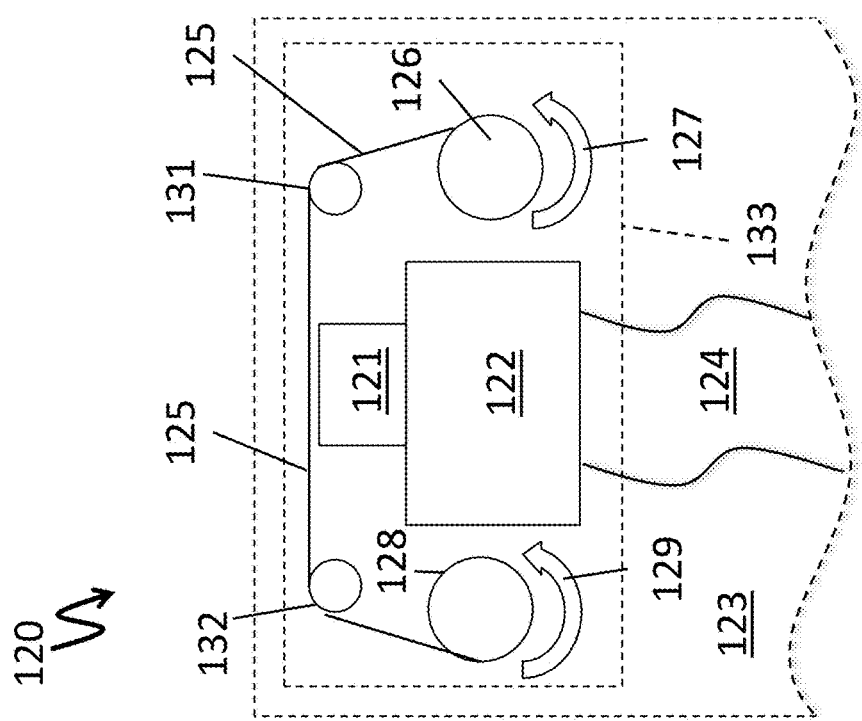

FIGS. 13A and 13B are top plan views of two optical sensor lens protectors 120 and 140, or apparatus for protecting image capturing devices, respectively, according to further aspects of the invention. According to this aspect of the invention, lens protectors 120 and 140 may be used with any one or more of the optical sensors 12, 32, 62, and 92 disclosed herein to protect the sensor lens and the sensor and to minimize or prevent the obstruction of the lens by foreign matter that may obscure the aperture of a optic sensor, for example, dust, dirt, mud, snow, condensation, and water, among other undesirable foreign matter, obstructions or debris.

As shown in FIG. 13A, lens protector 120 is used to protect lens 121 of optic sensor 122, which may typically mounted on a substrate 123 or be mounted as an accessory on an existing product, such as, to a GoPro Hero or AEE camera, and the like. (Only a portion of which is shown in phantom in FIG. 13A.) As is typical, optical sensor 122 may communicate with other components in an image capturing system as disclosed herein by mean of ribbon cable 124. As shown, lens protector 120 typically includes a substantially continuous strip of substantially transparent film 125 dispensed from a dispensing roller (or source roll) 126, as indicated by curved arrow 127, and is passed in front of the lens 121 or the aperture of optical sensor 122 (for example, across a field of view of the aperture of the optical sensor 122), at least partially shields the aperture from ambient environment, and then retrieved on take-up roller (or take-up roll) 128, as indicated by curved arrow 129. Lens protector 120 may include idler rollers 131 and 132 to assist in positioning film 125 before lens 121, though in some aspects of the invention no idler rollers are needed.

According to aspects of the invention, the intermittent or continuous displacement of film 125 from in front of lens 121 displaces any foreign matter or debris (not shown) from the ambient environment that may accumulate on film 125 that may lie in front of and obstruct lens 121 or aperture of optical sensor 122. In addition to displacing debris, film 125 may also protect lens 121, the aperture of optical sensor 122, and optical sensor 122 from contact or fouling by foreign matter or debris. Dispensing roll 126 and/or take-up roll 128 may be manually or automatedly operated, for example, by a stepper motor. Lens protector, or apparatus for protecting image capturing devices, 120 may be contained in a housing 133, for example, a housing mounted over optical sensor 122 and mounted to substrate 123.

Film 122 may typically be substantially transparent plastic, for example, a DuPont Teijun mylar film (such as, a Teijun mylar DS film) or an optically clear plastic and have a thickness ranging from about 90 gauge to about 200 gauge.

As shown in FIG. 13B, lens protector, or apparatus for protecting a image capturing device, 140 is used to protect lens 141 of optic sensor 142, which may typically mounted on a substrate 143 (only a portion of which is shown in FIG. 13A). As is typical, optical sensor 142 may communicate with other components in an image capturing system as disclosed herein by mean of ribbon cable 144. As shown, lens protector 140 typically includes a plurality of strips of transparent film 145, for example, a plurality of individual sequentially-positioned substantially transparent strips of film, which are mounted adjacent to each other (for example, in a stack) in front of lens 141 or the aperture of optical sensor 142, and at least partially shield the aperture from ambient environment. According to aspects of the invention, lens protector 140 may include a least three individual sequentially-positioned substantially transparent strips of film 145, but, depending upon the operating conditions, may include 10 or more strips 145, or 100 or more strips 145. According to this aspect of the invention, as each outer most strip of transparent film 145 accumulates debris (not shown), successive outer strips 145, for example, one strip and then another strip of the individual sequentially-positioned substantially transparent strips of film, are removed (as indicated by arrow 146) and, for example, discarded. The removal, displacement, or translation of successive strips of film 145 may be practiced by any conventional means, for example, as shown in FIG. 13B, each strip 145 may be attached to a cord or string 147 (such as, a fishing line type string) operatively connected to each strip 145, for example, by tying, by an adhesive, or by a mechanical fastener, and successively displaced from before lens 141.

According to aspects of the invention, the displacement of film strips 145 from in front of lens 141 displaces any foreign matter or debris (not shown) that may accumulate on film 145 that lies in front of lens 141 or aperture of optical sender 142. In addition to displacing debris, film strips 145 may also protect lens 141 and optical sensor 142 from contact or fouling by foreign matter or debris. The removal of film strips 145 may be practiced manually or automatedly. Lens protector 140 may be contained in a housing 148, for example, a housing mounted over optical sensor 142 and mounted to substrate 143.

Film strips 145 may typically be substantially transparent plastic, for example, a 1.0 haze factor plastic and have a thickness ranging from about 90 gauge to about 200 gauge, a height ranging from about 10 mm to about 150 mm, and a width ranging from about 10 mm to about 150 mm.

Though housings 63 shown in FIGS. 4-7 may be circular in shape as shown and housing 93 in FIGS. 8-12 may be rectangular as shown, according to aspects of the invention housings 63 and 93 may have a broad range of shapes while having the desired characteristics of housing optical systems, minimizing profile and footprint, among other advantages disclosed herein. For example, housings 63 and 93 may be circular, oval, ellipsoidal, triangular, rectangular, and polygonal in shape, for example, having a footprint having one of these shapes, among others.

Housing 63 and 93, and any surface interface material positioned between housing 63 and 93 and the surface to which the housing is mounted, may be fabricated from a broad range of materials. Though housings 63 and 83, and any surface interface material, may be metallic, for example, steel, stainless steel, aluminum, titanium, and like structural metals, housings 63 and 93 may typically be non-metallic, for example, to minimize their weight. In one aspect, housings 63 and 93, and any surface interface material, may be made of wood or plastic, for example, a polyamide (PA), for example, nylon; a polyethylene (PE); a polypropylene (PP); a polyester (PE); a polytetraflouroethylene (PTFE); an acrylonitrile butadiene styrene (ABS); a polycarbonate (PC); or a polyvinylchloride (PVC), among other plastics. In one aspect, housings 63 and 93, and any surface interface material, may be made of an elastomeric material or rubber, for example, a natural polymer, such as, polyisoprene rubber, or a synthetic polymer, such as, a neoprene, a thermoplastic elastomer, a thermoplastic rubber, and a polyvinyl chloride, an ethylene propylene diene monomer (EPDM) rubber, or a silicone rubber, and the like.

The size of housings 63 and 93 may vary depending upon the nature of the application. In one aspect, housings 63 may have a diameter 69 ranging from 1 inch to about 2 feet, but is typically between about 3 inches and 6 inches in diameter. Similarly, housings 93 may have a length 109 ranging from 1 inch to about 2 feet, but is typically between about 3 inches and 6 inches in length, with an appropriate width based upon the length 109. The thickness of any surface interface material may vary from about 0.0625 inches to about 6 inches, but is typically between about 0.25 inches and 2 inches, for example, between about 0.25 inches and about 1 inch.

As noted previously, aspects of the invention, for example, the optical systems, the housings 63 and 93, and the attachment of housings 63 and 93 to their respective surfaces are uniquely designed to adhere to or exceed the appropriate safety standards. For example, aspects of the invention may be adapted to adhere to ASTM or DOT standards, for instance, ASTM F1163 for horseback riding and equestrian helmets; ASTM F2040 for skiing and snowboarding helmets; ASTM F717 and NOCSAE ND002 for football helmets; ASTM F1045-07 for ice hockey helmets; DOT FMVSS 218 and Snell M-2005 for ATV riding, motocross and motorcycle helmets, among other standards and usages.

Other features that may be incorporated into aspects of the invention may include one-way or two-way audio transmission, global positioning system (GPS), and other detectors, such as, one or more accelerometers, temperature sensors, pressure sensors, altitude sensors, position sensors, speed sensors, and the like. The data detected by the one or more detectors or sensors may be stored for later review, transmitted, for example, wirelessly, or displayed for viewing by a user of the optical systems disclosed herein, for example, on display and/or indicator 58.

In one aspect, radio frequency (RF) shielding may be provided to protect the user of the optical systems disclosed herein, if necessary. For example, RF shielding material may be positioned about the optical systems or within the housings disclosed herein. In another aspect, one ore more laser light source, for example, a green or a red laser light may be included in the optical imaging systems disclosed herein. For example, one or ore laser lights (or beams) may be provided for sighting, ranging, or targeting purposes, among other uses.

In FIGS. 1 through 12, aspects of the present invention have been disclosed and described in all their aspects with respect to head gear, for example, helmets, such as, hockey helmets and jockey helmets. Though aspects of the present invention may be uniquely applicable to head gear, other aspects of the invention are not limited to use in head gear. In general, aspects of the present invention may be mounted, used, or otherwise applied to any surface conducive to receive one or more of the housings disclosed herein, for example, surfaces for which impact forces are preferably attenuated, among other surfaces. Though aspects of the invention may be useful when mounted to mobile surfaces, for example, cars, boats, planes, motorcycles, and the like, aspects of the invention may also be effective when mounted to stationary surfaces, for example, to desk tops, roof tops, poles, and other structures.

According to one aspect, the image capturing systems disclosed herein may be mounted to clothing or apparel, for example, pants, shirts, jackets, coats and hats, among other items of apparel. In addition, aspects of the invention may be mounted to accessories or gear, for example, to a back pack, to skis, to skateboards, to surf boards, to snowboards, to harnesses, and to equipment, among other accessories and gear.

In addition, aspects of the invention may be used in a broad range of fields, for example, head gear and/or apparel in a broad range of fields. These fields include but are not limited to: military, law enforcement, police, SWAT, firefighting, first responders, sports and recreation, automobile racing, motorcycle and motor cross, snowmobiling, all-terrain vehicles (ATV), bob sleds, skiing, aeronautics, missiles and defense, rockets, and video and movie production, among others.

Though aspects of the invention disclosed herein may be uniquely adapted to environments where the disclosed image capturing systems may be subject to loading or impact, aspects of the present invention may also be applicable to "non-contact" uses. These non-contact uses include non-contact sports, such as, hunting or fishing; officiating, such as, referees, umpires, and other officials; the work place, such as, mining and construction; education and instruction; and entertainment and broadcasting, both for the casual user and the professional.

As described herein, aspects of the present invention provide image capturing systems and methods for capturing images that address the need to minimize the profile of the systems to minimize the exposure to loading, such as impacts, while, if impacted, aspects of the invention minimize or prevent the transmission of the impact forces to the surfaces to which the system are mounted, for example, head gear. Aspects of the present invention provide flexible and modular designs that are amenable to enhancement or interfacing with existing technologies. Aspects of the present invention overcome the limitations of the prior art by, among other things, adhering to applicable safety standards of the field of application. As will be appreciated by those skilled in the art, features, characteristics, and/or advantages of the various aspects described herein, may be applied and/or extended to any embodiment (for example, applied and/or extended to any portion thereof).

Although several aspects of the present invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

The invention claimed is:
1. An image capturing system comprising:
at least one optical sensor adapted to receive optical images and convert the optical images to electrical signals corresponding to the optical images;
an output device adapted to receive the electrical signals from the at least one optical sensor and transmit a signal corresponding to the optical images to a receiver;

a housing adapted to retain the least one optical sensor and the output device, the housing comprising an energy absorbing material and the housing is adapted to mount to a surface wherein upon loading above a specific threshold the housing detaches from the surface; and a flexible substrate mounted in the housing and to which the at least one optical sensor and the output device are mounted, wherein the flexible substrate is adapted to conform to a contour of the surface;

wherein the housing comprises a circular housing having a circular footprint at least partially in contact with the surface; and wherein a size of the circular footprint is selected to distribute a force on the circular housing through the circular footprint to attenuate a force transmitted to the surface through the circular housing.

2. The image capturing system as recited in claim 1, wherein the housing comprises a height above the surface that minimizes exposure to contact.

3. The image capturing system as recited in claim 2, wherein the profile of the housing above the surface that minimizes exposure contact comprises a height of the housing above the surface of at most 25 mm.

4. The image capturing system as recited in claim 1, wherein the circular footprint comprises a diameter, wherein the diameter of the circular footprint is at least 1.5 times greater than a largest lateral dimension of the at least one optical sensor.

5. The image capturing system as recited in claim 1, wherein the surface comprises a surface of a headgear, and wherein the size of the footprint is selected to distribute the force on the housing through the footprint to attenuate a force transmitted to the surface of the head gear.

6. The image capturing system as recited in claim 5, wherein the headgear comprises at least one of a ski helmet, a snowboard helmet, a skateboard helmet, a motor cycle helmet, a snow mobile helmet, football helmet, a hockey helmet, a lacrosse helmet, and auto racing helmet.

7. The image capturing system as recited in claim 1, wherein the signal transmitted by the output device comprises one of a cellular signal, a Wi-Fi signal, an HDMI signal, a Bluetooth signal, a USB signal, and a microwave signal.

8. A method of capturing images comprising:
providing a circular housing having a circular footprint adapted to mount to a surface;
selecting a dimension of the circular footprint of the housing to attenuate transfer of a force from the housing to the surface;
positioning at least one optical sensor adapted to receive optical images and convert the optical images to electrical signals corresponding to the optical images and an output device adapted to receive the electrical signals from the at least one optical sensor and transmit a signal corresponding to the optical images to a receiver on a flexible substrate in the circular housing;
mounting the circular housing having the flexible substrate with the at least one optical sensor and the output device on the surface, and wherein the circular housing detaches from the surface when the circular housing is exposed to a predetermined force;
capturing optical signals with the at last one optical sensor;
transmitting the signal corresponding to the captured optical images to a receiver;
when the housing is contacted by the force, allowing at least one of the circular footprints of the housing having the selected dimension and the surface interface material attenuate the force transmitted by the housing to the surface; and
wherein when the circular housing is exposed to a force greater than the predetermined force, allowing the circular housing to detach from the surface.

9. The method as recited in claim 8, wherein the circular housing further comprises a height above the surface, and wherein the method further comprises selecting a height of the circular housing to minimize exposure of the circular housing to contact.

10. The method as recited in claim 8, wherein the at least one optical sensor comprises a largest lateral dimension, and wherein selecting the dimension of the circular footprint comprises selecting a diameter of the circular footprint at least 1.5 times greater than the largest lateral dimension of the at least one optical sensor.

11. The method as recited in claim 8, wherein the force comprises an impact force.

12. An image capturing system comprising:
a circular housing adapted to mount to head gear, the circular housing having a circular footprint adapted to minimize transfer of impact loading on the circular housing to the head of a wearer of the head gear, wherein the housing comprises an energy absorbing material and the housing is adapted to mount to a surface wherein upon loading above a specific threshold the housing detaches from the surface; and
at least one optical sensor mounted on a flexible substrate in the circular housing, the at least one optical sensor adapted to receive optical images and convert the optical images to electrical signals corresponding to the optical images;
wherein the circular footprint adapted to minimize the transfer of impact loading on the circular housing to the head of a wearer of the head gear comprises a circular footprint having a diameter at least 1.5 times a width of the at least one optical sensor.

13. The image capturing device as recited in claim 12, wherein the circular housing comprises a maximum thickness at a center of the circular housing and a thickness that varies from the maximum thickness with radial distance from the center of the circular housing.

14. The image capturing device as recited in claim 12, wherein the circular footprint comprises a diameter at least 3 times the width of the at least one optical sensor.

15. The image capturing system as recited in claim 1, wherein the system further-comprises an interface material positioned between the circular housing and the surface, the interface material adapted to attenuate a force transmitted to the surface through the circular housing.

16. The method as recited in claim 8, wherein the method further comprises positioning an interface material between the circular housing and the surface to attenuate a force transmitted to the surface through the circular housing.

* * * * *